(12) United States Patent
Orten

(10) Patent No.: US 8,156,749 B1
(45) Date of Patent: *Apr. 17, 2012

(54) PORTABLE SPRINKLER SYSTEM

(76) Inventor: Philip A. Orten, Loris, SC (US)

( * ) Notice: Subject to any disclaimer, the term of this patent is extended or adjusted under 35 U.S.C. 154(b) by 34 days.

This patent is subject to a terminal disclaimer.

(21) Appl. No.: 13/007,694

(22) Filed: Jan. 17, 2011

Related U.S. Application Data (63) Continuation-in-part of application No. 12/586,360, filed on Sep. 21, 2009, now Pat. No. 7,878,012.

(51) Int. Cl.
*F25B 39/04* (2006.01)
*F28D 5/00* (2006.01)

(52) U.S. Cl. .......................... 62/183; 62/305

(58) Field of Classification Search .............. 62/183, 62/121, 304, 305, 171, 91, 526
See application file for complete search history.

(56) References Cited

U.S. PATENT DOCUMENTS

| | | | |
|---|---|---|---|
| 2,278,242 A | 3/1942 | Chapman | |
| 2,450,571 A | 10/1948 | Bahnson, Jr. | |
| 4,213,306 A | 7/1980 | Peabody et al. | |
| 5,285,651 A | 2/1994 | Marine | |
| 5,311,747 A | 5/1994 | Pringle et al. | |
| 5,643,082 A | 7/1997 | Furukawa | |
| 6,105,376 A | 8/2000 | Stewart et al. | |
| 6,220,293 B1 * | 4/2001 | Rashidi | 137/624.18 |
| 6,253,565 B1 | 7/2001 | Arledge | |
| 6,381,980 B1 | 5/2002 | Pringle | |
| 6,438,977 B1 | 8/2002 | McKay | |
| 6,658,872 B1 | 12/2003 | James | |
| 6,834,662 B1 * | 12/2004 | Olson et al. | 137/15.18 |
| 6,892,552 B2 | 5/2005 | Richman et al. | |
| 7,878,012 B1 * | 2/2011 | Orten | 62/183 |

* cited by examiner

*Primary Examiner* — Chen-Wen Jiang
(74) *Attorney, Agent, or Firm* — P. Jeff Martin; The Law Firm of P. Jeffrey Martin, LLC (57) ABSTRACT

A portable sprinkler system for an air conditioner cooling system includes a fluid source coupled to the sprinkler system, a plurality of spray nozzles fluidly connected by conduit, a step-down transformer, a solenoid, and an in-line filter connected in series, a protective cover enclosing the sprinkler system, and an electricity source providing electricity to the system. A plurality of shields are coupled to the housing of the air conditioner cooling system, the shields arranged to deflect air turbulence.

19 Claims, 5 Drawing Sheets

PORTABLE SPRINKLER SYSTEM

RELATED APPLICATIONS

The present invention is a Continuation-in-Part of application Ser. No. 12/586,360, filed on Sep. 21, 2009 now U.S. Pat. No. 7,878,012.

BACKGROUND OF THE INVENTION

1. Field of the Invention

This application discloses claims and embodiments generally related to a portable sprinkler system for a cooling system, and more particularly, a sprinkler system coupled to and removable from an air conditioner system for supplying a fluid mist to the coils of the air conditioner system.

2. Description of the Related Art

It is desirable enhance the efficiency of air conditioner or cooling systems. One particular way to increase the efficiency is to lower the heat generated by the system, thereby lowering the energy expended by the system. Thus, it is advantageous to have an apparatus or device having the elements and features disclosed herein.

Several products and inventions have been proposed in order to achieve these goals. The art discloses apparatuses or devices that cool the condenser coils by supplying a fluid mist to the coils. However, the art does not appear to disclose the combination of elements and features disclosed herein.

This application presents claims and embodiments that fulfill a need or needs not yet satisfied by the products and inventions previously or presently available. In particular, the claims and embodiments disclosed herein describe a portable sprinkler system optionally having a protective, the system and/or cover coupled to an air conditioner system. The system may also include protective shields for directing the distribution of the fluid stream onto the coils. This application provides an unanticipated and nonobvious combination of features distinguished from the products and inventions preexisting in the art. The applicant is unaware of any product, disclosure or reference that discloses the features of the claims and embodiments disclosed herein.

A search of the prior art did not disclose any patents that read directly on the claims of the instant invention; however, the following references were considered related.

U.S. Pat. No. 5,285,651, issued in the name of Marine;
U.S. Pat. No. 6,658,872 B1, issued in the name of James;
U.S. Pat. No. 6,892,552 B2, issued in the name of Richman et al.;
U.S. Pat. No. 2,278,242, issued in the name of Chapman;
U.S. Pat. No. 5,311,747, issued in the name of Pringle et al.;
U.S. Pat. No. 6,381,980 B1, issued in the name of Pringle;
U.S. Pat. No. 2,450,571, issued in the name of Bahnson;
U.S. Pat. No. 6,253,565 B1, issued in the name of Arledge;
U.S. Pat. No. 6,105,376, issued in the name of Stewart et al.;
U.S. Pat. No. 4,213,306, issued in the name of Peabody et al.;
U.S. Pat. No. 5,643,082, issued in the name of Furukawa; and
U.S. Pat. No. 6,438,977 B1, issued in the name of McKay.

This application presents claims and embodiments that fulfill a need or needs not yet satisfied by the products, inventions and methods previously or presently available. In particular, the claims and embodiments disclosed herein describe a portable sprinkler system for a cooling system comprising a fluid source coupled to the sprinkler system, a plurality of spray nozzles fluidly connected by conduit, a solenoid connected in series, a protective cover enclosing the sprinkler system, and an electricity source providing electricity to the system, the portable sprinkler system providing unanticipated and nonobvious combination of features distinguished from the products, inventions and methods preexisting in the art. The applicant is unaware of any product, method, disclosure or reference that discloses the features of the claims and embodiments disclosed herein.

SUMMARY OF THE INVENTION

In accordance with one embodiment, a portable sprinkler system for a cooling system comprises a fluid source coupled to the sprinkler system, a plurality of spray nozzles fluidly connected by conduit, a solenoid connected in series, a protective cover enclosing the sprinkler system, and an electricity source providing electricity to the system.

In accordance with this embodiment, the portable sprinkler system may include a chemical injector for treating the fluid.

In accordance with this embodiment, the portable sprinkler system may include a filter for treating the fluid.

In accordance with this embodiment, the portable sprinkler system may include a water tight plug between the electricity source and the solenoid.

In another embodiment, an air conditioner cooling system comprises a portable sprinkler system coupled to the air conditioner cooling system, the portable sprinkler system comprising a water source coupled to the sprinkler system, a plurality of spray nozzles fluidly connected by conduit, a chemical injector for inhibiting mineral build-up, a filter, and a solenoid connected in series. The air conditioner cooling system also includes a disconnect unit electrically connected to a transformer, the transformer electrically coupled to the solenoid, and a plurality of shields coupled to the housing of the air conditioner, the shields arranged to deflect air turbulence.

In accordance with this and other embodiments, the portable sprinkler system may be removably attachable to air conditioner housing.

In accordance with this and other embodiments, the portable sprinkler system further comprises a protective cover. The protective cover may comprise at least one supporting unit for holding at least the conduit. The protective may further comprise a water tight connection between the transformer and the protective cover.

In accordance with this and other embodiments, the shields protect the spray nozzles and the fluid distributed therefrom.

In accordance with this and other embodiments the transformer comprises a 120 v to 240 v double insulated transformer.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

Detailed Description of the Figures

Figure 1:
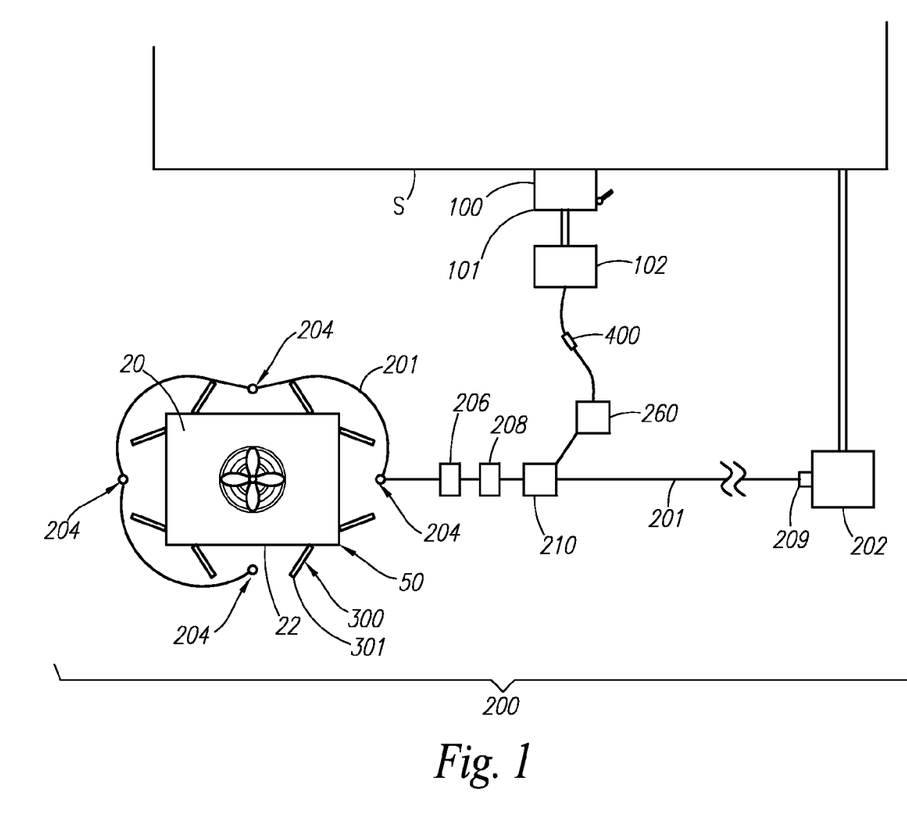
FIG. 1 is a plan view of the system disclosed herein.
Figures 2, 2A, 2B:
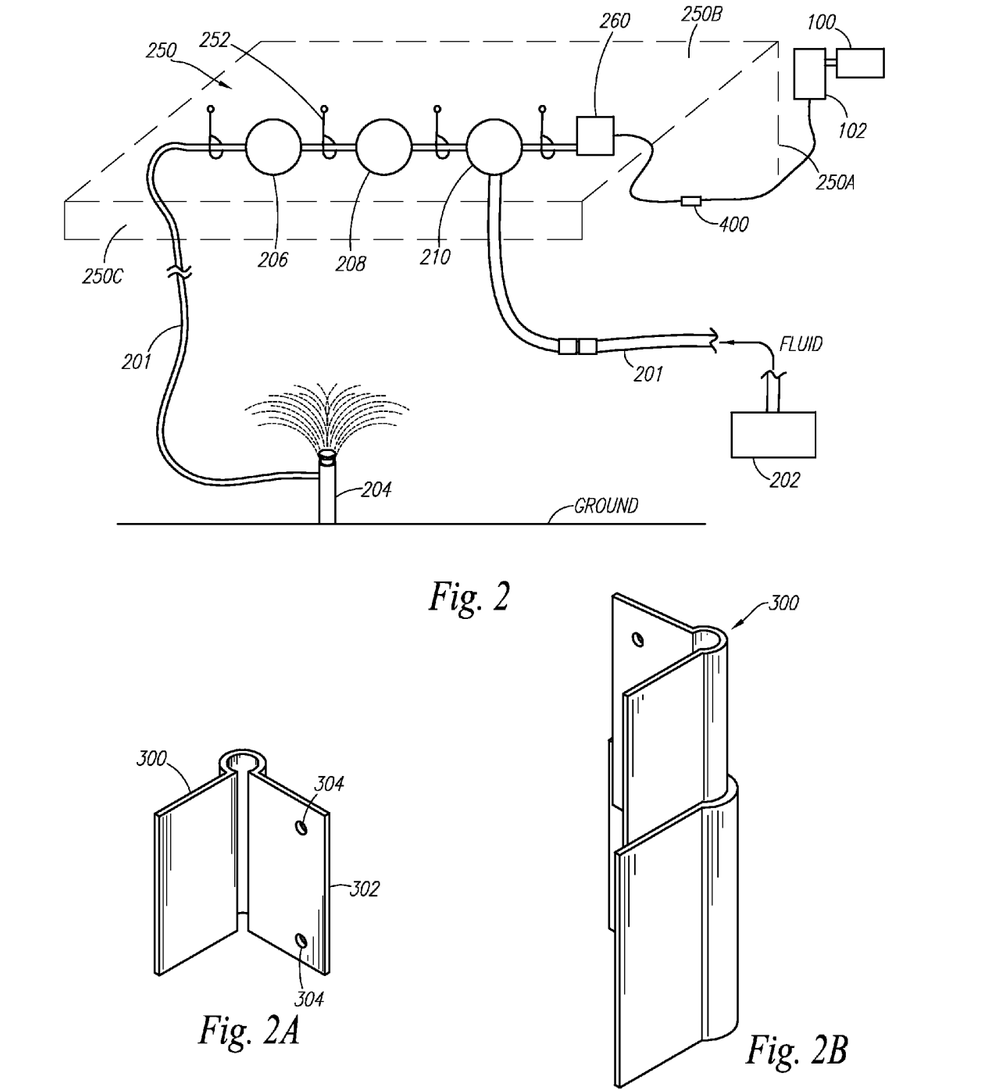
FIG. 2 a perspective view of a protective cover incorporated into the system.
FIG. 2A is a perspective view of a shield, according to one embodiment of the present invention.
FIG. 2B is a perspective view of a telescopically adjustable shield, according to one embodiment of the present invention.
Figure 5:
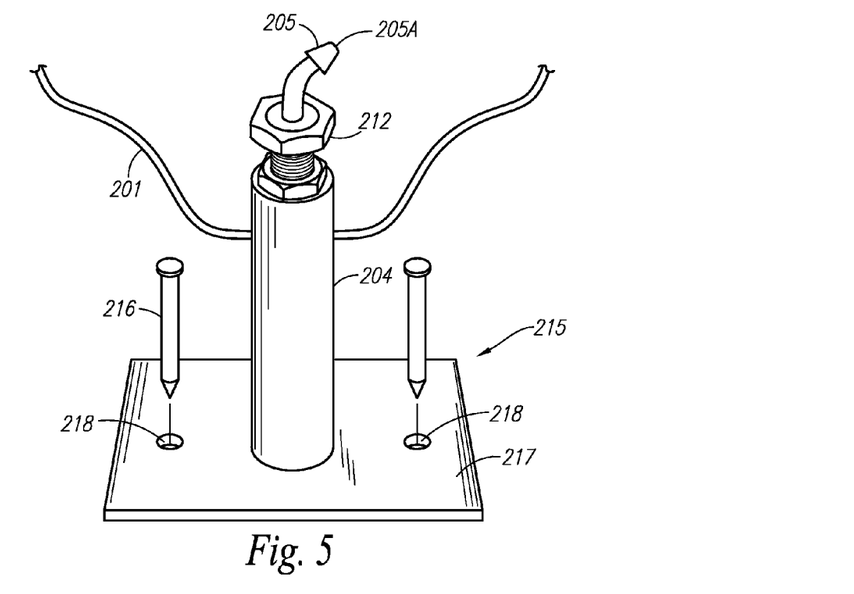
FIG. 5 is a perspective view of a nozzle illustrating the securing connector thereof, and a mechanical fastener, according to one embodiment of the present invention.

Referring now to FIGS. 1-2, and 5, one embodiment disclosed describes an air conditioner system having a portable sprinkler system. A cabinet type of air conditioner unit, or heating, ventilation, and air-conditioning (HVAC) unit 20, is depicted having a series of louvered side panels exteriorly protecting a condenser unit 21 and a series of condenser coils. The condenser coils are arranged in a serpentine manner with the coils comprising a continuous flow path for conducting a fluid for cooling the unit 20, fluids usually labeled as refrigerants. Common refrigerants include the general chemical class of haloalkanes, and more particularly chlorofluorocarbons (CFCs) (e.g. Dupont refrigerant brand sold under the trademark FREON), hydrochlorofluorocarbons (HCFCs) and hydrofluorocarbons (HFCs). At least one fan blade is utilized to draw ambient air across the coils to aid in cooling the system and reducing the heat generated by the unit 20. As a means to further improve the cooling of the system and reduce heat build-up, a fluid mist is sprayed on or near the coils, usually in the form of water.

In accordance with this understanding, and referring now to the figures, an air conditioner cooling system 50 is disclosed generally comprising a disconnect unit 100 electrically connected to a transformer 102, and a portable sprinkler system 200 coupled to the air conditioner cooling system 50, and a plurality of shields 300 coupled to the cabinet 22 or housing of the air conditioner 20 for deflecting air turbulence from the nozzles 204 comprising part of the sprinkler system 200. The nozzles 204 each comprising a body 204a from which a nozzle head 205 extends therefrom and is in fluid communication therewith. The nozzles 204 each further comprising a nozzle head 205 having a nozzle opening 205a, the nozzle head 205 is maintained in a desired fixed directional position via a securing connector 212. The air conditioner cooling system 50 is adapted for residential or commercial use.

The disconnect unit 100 for the condenser unit 21 is mounted to the outside of a structure S, such as a wall of a home or building. The disconnect unit 100 may include a protective box 101 enclosing the unit protecting the unit from exposure to environmental elements, including a variety of extreme weather conditions. The disconnect unit 100 and the transformer 102 are mutually coupled to one another via sealed electrical coupling. The transformer 102 is a 240 v to 120 v double insulated construction fused on the primary (PRI) winding of the transformer 102. As will be explained in greater detail below, the transformer 102 is electrically coupled to a solenoid 210 that comprises the portable sprinkler system 200 disclosed above.

The sprinkler system 200 may comprise a fluid source 202 coupled to the sprinkler system 200, providing water or other appropriate fluid distributed on or near the coils of the system 50. The sprinkler system 200 may also include a plurality of spray nozzles 204 fluidly coupled by conduit 201 to the fluid source 202. A conduit-to-fluid source adapter 209 fluidly connects fluid source 202 to conduit 201. Intermediately disposed between the fluid source 202 and the nozzles 204 may be a chemical injector 206 that may supply a solid or fluid chemical treatment for inhibiting mineral build-up within the conduit 201 and/or the nozzle heads 205 of the nozzles 204. Also intermediately disposed between the fluid source 202 and nozzles 204 may be a fluid filter 208 for cleaning contaminants from the fluid distributed from the fluid source 202. Fluid filter 208 may be defined as a 5 micron filter for filtering and conditioning the fluid distributed from the fluid source 202. The fluid filter 208 is adapted and configured to retain or suspend metals and/or minerals, such as calcium and the like, present in the fluid distributed from the fluid source 202, thereby preventing metal and/or mineral build-up and blockage within the conduit 201 and/or the nozzle heads 205 of the nozzles 204. The fluid filter 208, according to one embodiment, may be defined as having a maximum flow rate of 0.50 gallons per minute (GPM) or 1.9 liters per minute (LPM).

The sprinkler system 200 may also include a solenoid 210 connected in series for controlling the flow of fluid through the system 50. A ground fault circuit interrupter (GFI) 260 is connected between solenoid 210 and the transformer 102. A water impermeable connector 400 connects GFI 260 to transformer 102, the water impermeable connector 400 more specifically defined as a 24 volts alternating current (VAC) watertight connector.

Figures 3, 4:
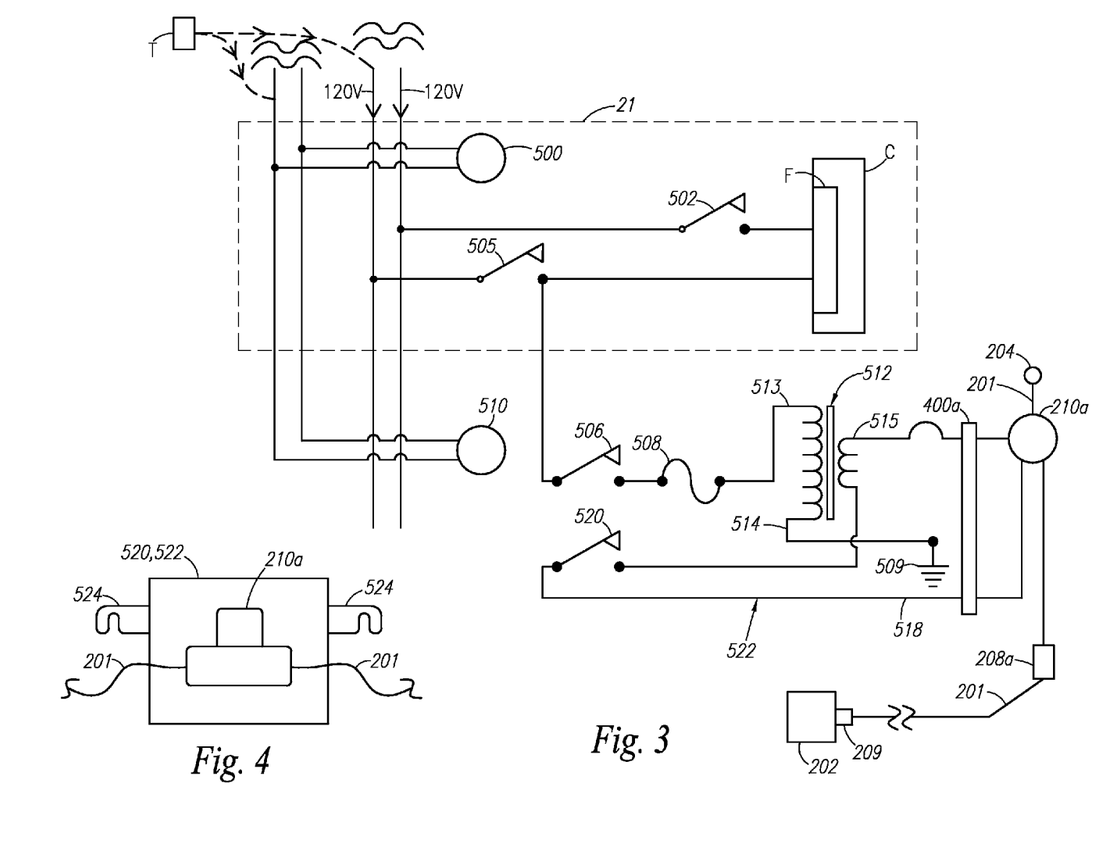
FIG. 3 is a detailed block diagram of the system described herein, according to one embodiment of the present invention.
FIG. 4 is a front elevational view of a solenoid of the system in accordance to one embodiment of the present invention, the solenoid shown supported by a support structure.

Referring now to FIGS. 3-4, in accordance with one embodiment of the present invention, intermediately disposed between the fluid source and solenoid 210a is an in-line filter 208a for cleaning contaminants from the fluid distributed from the fluid source 202. The in-line filter 208a may be defined as a 5 micron filter for filtering and conditioning the fluid distributed from the fluid source 202. The in-line filter 208a is adapted and configured to retain or suspend minerals, such as calcium and the like, present in the fluid distributed from the fluid source 202, thereby preventing mineral build-up and blockage within the conduit 201 and/or the nozzle heads 205 of the nozzles 204. The in-line filter 208a may be defined as providing a maximum flow rate of 0.50 gallons per minute (GPM) or 1.9 liters per minute (LPM). The in-line filter 208a, according to one embodiment, may also be configured to retain or suspend metals.

In order to actuate solenoid 210a, a thermostat T of a condenser 21 of an HVAC unit 20 regulates energization of a main contact 500 and a primary relay 510 with 240 volts, the main contact 500 being a double contact, single-throw relay. More specifically, main contact 500 comprises a first contact relay 502 and a second contact relay 505, the relays 502 and 505 being parallel. Upon being energized, the first contact relay 502 and second contact relay 505 close sending 240 volts to a compressor C and fan F. The second contact relay 505 is in electrical connection with a first secondary contact 506. Closure by the second contact relay 505 supplies the first secondary contact 506 with 120 volts, thereby actuating closure of the first secondary contact 506 and supplying 120 volts to a step-down transformer 512 in electrical connection therewith, the step-down transformer 512 being in electrical connection with the solenoid 210a. Connected between first secondary contact 506 and step-down transformer 512 is a fuse 508 having an electric current measure of approximately between 0.25 amperes and 1.50 amperes. The fuse 508 as shown herein has an electric current measure of 0.75 amperes.

The step-down transformer 512 includes a first section 513 through which electrical energy passes therefrom via wiring 514 to a ground 509. The step-down transformer 512 includes a second section 515 which transforms the 120 volts of energy to 24 VAC which is supplied to solenoid 210a, the second section 515 energizes a second secondary contact 520 in electrical connection therewith and actuating closure of second secondary contact 520, wherein closure by the second secondary contact 520 forming a closed loop circuit 522 (to be described in greater detail hereinbelow).

A water impermeable connector 400a connects step-down transformer 512 to solenoid 210a, wiring 518 extends from water impermeable connector 400a and returns connectively to the second secondary contact 520, thereby forming a closed loop circuit 522. The water impermeable connector 400a is more specifically defined as a 24 VAC water-tight connector.

In further accordance to this embodiment, solenoid 210a is supported by a support structure 520, shown herein as a plate 522 to which solenoid 210a is suitably secured. The support structure 520, or plate 522, comprises a pair of support brackets for 524 detachably securing the solenoid 210a in a desired location, such as to a structure S, being proximal to the HVAC unit 20 and fluid source 202.

Referring now more specifically to FIGS. 1-2, and 5, the sprinkler system 200 may further comprise a protective cover 250 that encloses the various components used in combination for a particularly configured system 50. The cover 250 comprises an upright wall 250a having an upper portion from which a roof 250b integrally extends perpendicularly therefrom. The roof 250b includes a forward edge from which an elongated skirt member 250c integrally extends perpendicularly therefrom. The cover 250 may comprise a variety of materials, including non-conductive metal, general plastic material, thermoplastic polymers such as polypropylene, polyethylene or polystyrene, or other similar and suitable materials. The cover 250 may include a plurality of support units 252 for securing and holding the conduit 201 and/or the various components of the sprinkler system 200. The support units 252 are envisioned to inhibit crimping or binding of the conduit 201, reducing the damage to the conduit 201, and extending the usable life of the conduit 201. In addition, organization of the conduit 201 and the interconnected components optimizes space allocation and permits the sprinkler system 200 to be compacted into a manageable and portable unit as provided.

The series or combination of nozzles 204 may be mounted in a variety of positions, including directly to the cabinet 22 of the air conditioner system 20, or mounted separately but adjacent to the system 20. For example, the series of nozzles 204 may be mounted in the ground or near the base of the system 50 for distributing the fluid upward and onto the coils within the cabinet 22. In such a configuration, the individual nozzles 204 of the series are interconnected by conduit 201, with a securing connector 212 utilized for maintaining the series in a water mist, discharge-directed, fixed position. As depicted, in but one envisioned embodiment, the series of nozzles 204 is arranged so that at least one single nozzle 204 is directed to one exposed side of the air conditioner system cabinet 22 (in some systems, this may include three exposed sides or four exposed sides, generally). Each individual nozzle 204 is secured directionally in place by a connector or mount 212 accommodating the nozzle opening 205a of the nozzle head 205, so as not to block the egress of the fluid, and further accommodating the use of a mechanical fastener 215 (e.g. threaded screw or bolt, stake 216, integral base 217, and/or other similar item) for securing the nozzle 204 in a stationary position. Base 217 comprises a plurality of apertures 218 each adapted to receive a stake 216 therethrough, and wherein stake 216 extends from a respective aperture 218 into the ground, and thereby firmly securing nozzle 204 to the ground. The connector or mount 212, and therefore the individual nozzle 204, is firmly secured to the ground or the ground surface (such as a concrete pad or other firm surface) by use of the mechanical fastener 215 disclosed above.

Figure 6:
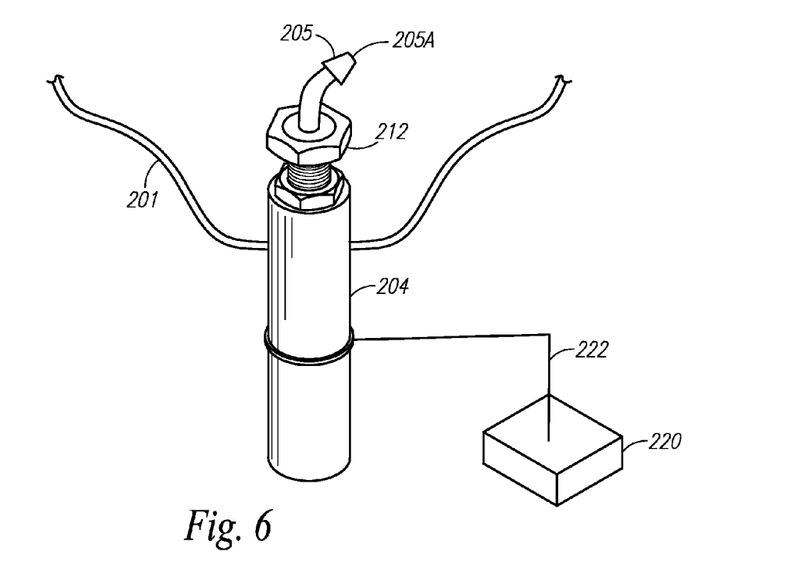
FIG. 6 is a perspective view of a mechanical fastener, according to an alternate embodiment of the present invention.

Mechanical fastener 215, according to another embodiment, may be in the form of weighted block 220 encased in plastic, as shown in FIG. 6. A lightweight bracket 222 mounted centrally atop weighted block 220 provides attachment means for removably attaching each nozzle 204 to a respective weighted block 220.

Figure 7:
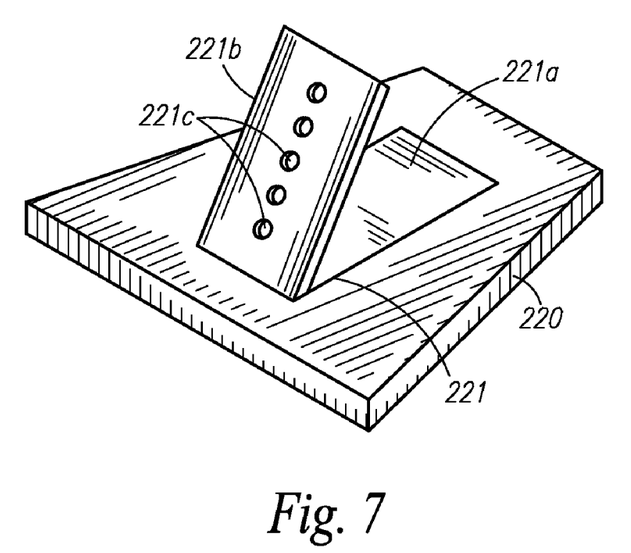
FIG. 7 is a perspective view of a mechanical fastener having a support member formed integral thereto, according to an alternate embodiment of the present invention.

Referring now more specifically to FIG. 7, in accordance to one embodiment, plastic encased weighted block 220 may comprise a V-shaped support member 221 formed integral to an upper surface of weighted block 220. The V-shaped support member 221 comprises a base portion 221a from which a panel portion 221b integrally extends upward therefrom at an angular orientation so as to form an acute angle. The panel portion 221b includes a series of linearly aligned nozzle head receiving holes 221c defined therethrough. The nozzle head receiving holes 221c are sized so as to allow the nozzle head 205 of a nozzle 204 to pass therethrough and to prevent passage by securing connector 212 of nozzle therethrough. The nozzle head receiving holes 221c allow for the selective, angularly-directional adjustment of the nozzles 204, according to user needs and desire.

In reference to FIGS. 1-3, it is envisioned that each nozzle 204 is configured, either in a fixed or variable manner, to accommodate and deliver at least one-half gallon of fluid per hour. As noted above, a plurality of shields 300 may be installed and/or incorporated into the overall configuration. Each shield 300 may be mounted or arranged so as to optimize the deflection of air turbulence that is generated at or near the sprayer nozzles 204. It is envisioned that a plurality of shields 300 may be necessary for each sprayer nozzle 204 location to further optimize air turbulence deflection. The shields 300 inhibit the air flow from disturbing the distribution path of the fluid mist. The shields 300 may be of a variety of lengths, widths and composed of a variety of materials. For example, and in but one embodiment, the length of the shield 300 is envisioned to extend from the top to the base of the cabinet 22 to fully shield the sprayer nozzle 204 and fluid stream from air disturbance. The plurality of shields 300 are constructed of a pliable material, preferably being an acrylic coated aluminum material, bendable to various shapes and configurations, and suitably rigid to thereafter maintain the newly formed shape and configuration. Being pliable allows the plurality of shields 300 to be shapely adjusted as necessary to facilitate customized coupling thereof to the cabinet 22 or housing of the air conditioner unit 20 in a manner so as to optimize air turbulence deflection. The plurality of shields 300 also function to shade the condenser coils of the air conditioner unit 20 from the sun, thereby keeping coils at a cooler temperature during periods of substantially hot weather temperatures.

Referring now more specifically to FIG. 1, the plurality of shields 300 may each comprise at least one nozzle head receiving aperture 301 defined therethrough. The nozzle head receiving aperture 301 is sized so as to allow the nozzle head 205 of a nozzle 204 to pass therethrough and to prevent passage by securing connector 212 of nozzle therethrough. The at least one nozzle head receiving aperture 301 provides an alternative means for securing the nozzles 204 in a stationary position for distributing the fluid onto the coils within the cabinet 22.

Referring now to FIGS. 2A-2B, in accordance with an another embodiment, each shield 300 comprises a V-shape having an angular measurement of approximately 60°. The shield 300 includes a mounting plate 302 having a plurality of holes 304 defined therethrough, wherein holes 304 in mounting plate 302 are adapted to align with bolts provided on housing or condenser unit of air conditioner unit 20. According to yet another embodiment, each shield 300 may be telescopically adjustable so as to allow for various, selective longitudinal settings thereof.

If optionally provided, the injector 206 may be coupled with the conduit 201 line to provide a chemical solid or fluid material for treating the fluid. For example, in a water-based system, one or more chemical treatments may be used to inhibit the accumulation of minerals or other types of deposits. By treating the fluid, the conduit 201 lines and sprayer nozzles 204 may be maintained for longer periods of time, and may reduce the physical maintenance required on the line or sprayer nozzles 204.

Also, if optionally provided, the filter 208 may be coupled with the conduit 201 line as well to capture any contaminants or particulates that may reduce the shell-life of the line and the sprayer nozzles 204. As important, the filter 208 may extract illness-causing contaminants from entering the air conditioner system. The filter 208 may be of a variety of forms, including charcoal, ultraviolet (UV), infrared (IR), magnetic, ionized or catalytic filters.

It is to be understood that the embodiments and claims are not limited in its application to the details of construction and arrangement of the components set forth in the description and illustrated in the drawings. Rather, the description and the drawings provide examples of the embodiments envisioned, but the claims are not limited to the specific embodiments. The embodiments and claims disclosed herein are further capable of other embodiments and of being practiced and carried out in various ways, including various combinations and subcombinations that may not have been explicitly disclosed. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the U.S. Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be broadly limited only by the following Claims.

What is claimed is:

1. An air conditioner cooling system comprising:
a portable sprinkler system coupled to an air conditioner cooling system, the portable sprinkler system comprising:
a water source coupled to the sprinkler system;
a plurality of spray nozzles fluidly connected by conduit;
a chemical injector for inhibiting mineral build-up;
a filter;
a solenoid connected in series;
a disconnect unit electrically connected to a transformer, the transformer electrically coupled to the solenoid;
a ground fault circuit interrupter electrically connected between the solenoid and the transformer;
a water impermeable connector electrically connects the ground fault circuit interrupter to the transformer; and
a plurality of shields coupled to the housing of the air conditioner, the shields arranged to deflect air turbulence.

2. The system of claim 1, wherein the portable sprinkler system is removably attachable to an air conditioner housing.

3. The system of claim 2, wherein the portable sprinkler system further comprises a protective cover.

4. The system of claim 3, wherein the protective cover comprises at least one supporting unit for holding at least the conduit.

5. The system of claim 3 further comprising a water tight connection between the transformer and the protective cover.

6. The system of claim 1, wherein the shields protect the spray nozzles and inhibit air flow from disturbing a distribution path of a fluid distributed therefrom.

7. The system of claim 1, wherein the transformer comprises a 120 v to 240 v double insulated transformer.

8. The system of claim 1, wherein the filter retains or suspends metals and/or minerals which are present in the fluid distributed from the water source, thereby preventing metal and/or mineral build-up and blockage within the conduit and nozzle heads of the plurality of spray nozzles.

9. The system of claim 1, wherein the plurality of spray nozzles are firmly secured to the ground via a mechanical fastener.

10. An air conditioner cooling system comprising:
a portable sprinkler system coupled to an air conditioner cooling system, the portable sprinkler system comprising:
a fluid source coupled to the sprinkler system;
a plurality of spray nozzles fluidly connected by conduit;
an in-line filter connected in series;
a solenoid connected in series, the solenoid being electrically energized via a disconnect unit, the disconnect unit electrically connected to a step-down transformer, the step-down transformer electrically coupled to the solenoid;

a water impermeable connector, the water impermeable connector electrically connects the step-down transformer to the solenoid, wherein the solenoid is actuated via operation of a thermostat of a condenser of the air conditioner cooling system, the thermostat regulates energization of a main contact and a primary relay with 240 volts, the main contact being a double contact, single-throw relay comprising a first contact relay and a second contact relay, the first contact relay and the second contact relay being parallel, and upon the first contact relay and the second contact relay being energized, the first contact relay and the second contact relay close sending 240 volts to a compressor and a fan, the second contact relay is in electrical connection with a first secondary contact, wherein closure by the second contact relay supplies the first secondary contact with 120 volts, thereby actuating closure of the first secondary contact and supplying 120 volts to the step-down transformer being in electrical connection with the first secondary contact, the step-down transformer being in electrical connection with the solenoid, the first secondary contact and the step-down transformer has a fuse connected therebetween, wherein the step-down transformer includes a first section through which electrical energy passes therefrom via a wiring of the first section to a ground, the step-down transformer includes a second section which transforms the 120 volts of energy to 24 VAC which is supplied to the solenoid, the second section of the step-down transformer energizes a second secondary contact in electrical connection therewith and actuating closure of the second secondary contact, wherein closure by the second secondary contact forming a closed loop circuit, and wherein the water impermeable connector connects the step-down transformer to the solenoid, the water impermeable connector having a wiring extending therefrom and returning connectively to the second secondary contact, thereby forming the closed loop circuit; and a plurality of shields coupled to the housing of the air conditioner cooling system, the shields arranged to deflect air turbulence.

11. The system of claim 10, wherein the plurality of spray nozzles are firmly secured to the ground via a mechanical fastener.

12. The system of claim 11, wherein the mechanical fastener comprises a weighted block encased in plastic.

13. The system of claim 12, wherein the weighted block comprises a V-shaped support member formed integral to an upper surface of the weighted block.

14. The system of claim 13, wherein the V-shaped support member comprises a base portion from which a panel portion integrally extends upward therefrom at an angular orientation so as to form an acute angle, the panel portion includes a series of linearly aligned nozzle head receiving holes defined therethrough, the nozzle head receiving holes are sized so as to allow a nozzle head of a spray nozzle to pass therethrough and to prevent passage by a securing connector of the spray nozzle therethrough, the nozzle head receiving holes allow for the selective, angularly-directional adjustment of the plurality of spray nozzles.

15. The system of claim 10, wherein the shields protect the spray nozzles and inhibit air flow from disturbing a distribution path of a fluid distributed therefrom.

16. The system of claim 15, wherein the shields are arranged so as to shade the condenser coils of the air conditioner cooling system from the sun, thereby keeping the condenser coils at a cooler temperature during periods of substantially hot weather temperatures.

17. The system of claim 10, wherein each the plurality of spray nozzles accommodate and deliver at least one-half gallon of fluid per hour.

18. The system of claim 10, wherein the in-line filter is a 5 micron filter, the in-line filter filters and conditions the fluid distributed from the fluid source, the in-line filter retains or suspends minerals present in the fluid distributed from the fluid source, thereby preventing mineral build-up and blockage within the conduit and the plurality of spray nozzles.

19. The system of claim 10, further comprising a support structure for supporting the solenoid.

\* \* \* \* \*